(12) United States Patent
Lee (10) Patent No.: US 8,800,533 B2
(45) Date of Patent: Aug. 12, 2014

(54) SYSTEM FOR PREVENTING KNOCKING AND METHOD FOR CONTROLLING THE SAME

(75) Inventor: Je Hyung Lee, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 249 days.

(21) Appl. No.: 13/236,309

(22) Filed: Sep. 19, 2011

(65) Prior Publication Data

US 2012/0143474 A1    Jun. 7, 2012

(30) Foreign Application Priority Data

Dec. 3, 2010 (KR) .................. 10-2010-0123014

(51) Int. Cl.
| | | |
|---|---|---|
| *F02M 25/14* | (2006.01) | |
| *F02B 7/00* | (2006.01) | |
| *F02D 19/06* | (2006.01) | |
| *F02D 41/40* | (2006.01) | |

(52) U.S. Cl.
CPC ........... *F02M 25/14* (2013.01); *F02D 19/0655* (2013.01); *F02D 41/402* (2013.01)
USPC ........... 123/431; 123/299; 123/300; 123/305; 123/198 A (58) Field of Classification Search
CPC . F02D 19/0655; F02D 41/402; F02D 35/027; F02M 25/14
USPC ............. 123/299, 300, 1 A, 27 GE, 431, 575, 123/198 A, 298, 301; 239/533.12
See application file for complete search history.

(56) References Cited

U.S. PATENT DOCUMENTS

| | | | | | |
|---|---|---|---|---|---|
| 5,593,095 | A | * | 1/1997 | Davis et al. ................... | 239/584 |
| 5,685,492 | A | * | 11/1997 | Davis et al. ................... | 239/584 |
| 5,740,777 | A | * | 4/1998 | Yamamoto et al. ........... | 123/305 |
| 5,996,912 | A | * | 12/1999 | Ren et al. ................... | 239/585.5 |
| 6,705,274 | B2 | * | 3/2004 | Kubo ............................. | 123/295 |
| 7,108,201 | B2 | * | 9/2006 | Fischer et al. ................. | 239/88 |
| 7,171,953 | B2 | * | 2/2007 | Altenschmidt ............... | 123/491 |
| 7,185,832 | B2 | * | 3/2007 | Kaden et al. ................ | 239/533.7 |
| 7,475,679 | B2 | * | 1/2009 | Biemelt et al. ............... | 123/531 |
| 7,942,349 | B1 | * | 5/2011 | Meyer ........................ | 239/585.1 |
| 7,971,567 | B2 | * | 7/2011 | Zubeck et al. ................ | 123/304 |

(Continued)

FOREIGN PATENT DOCUMENTS

| | | |
|---|---|---|
| JP | 2000-179368 A | 6/2000 |
| JP | 2001-355472 A | 12/2001 |

(Continued)

*Primary Examiner* — Hai Huynh
(74) *Attorney, Agent, or Firm* — Morgan, Lewis & Bockius LLP (57) ABSTRACT

A system and method for preventing knocking prevents knocking by injecting a sub fuel including ethanol having high octane number to a combustion chamber in a case that the knocking occurs. The system for preventing knocking may include a cylinder, a piston moving in the cylinder reciprocally, forming a combustion chamber with the cylinder, and having a central axis, a first injector mounted at an upper surface of the cylinder with a distance from the central axis of the piston, and directly injecting a main fuel including gasoline into the combustion chamber, a second injector mounted at the upper surface of the cylinder on the central axis of the piston, and directly injecting a sub fuel including ethanol into the combustion chamber, and a spark plug disposed at the upper surface of the cylinder near the second injector.

11 Claims, 5 Drawing Sheets

(56) References Cited

U.S. PATENT DOCUMENTS

| | | | |
|---|---|---|---|
| 8,235,024 B2* | 8/2012 | Zubeck et al. | 123/304 |
| 8,387,588 B2* | 3/2013 | Ashizawa | 123/301 |
| 8,459,574 B2* | 6/2013 | Achleitner et al. | 239/533.12 |
| 8,468,998 B2* | 6/2013 | Straub | 123/298 |
| 2003/0025006 A1* | 2/2003 | Scarbrough et al. | 239/533.12 |
| 2006/0226263 A1* | 10/2006 | Holzgrefe et al. | 239/533.12 |
| 2009/0159057 A1* | 6/2009 | Pursifull et al. | 123/575 |
| 2009/0234561 A1* | 9/2009 | Marriott et al. | 701/105 |
| 2011/0253096 A1* | 10/2011 | Easley et al. | 123/294 |
| 2012/0298072 A1* | 11/2012 | Zubeck et al. | 123/304 |
| 2013/0104850 A1* | 5/2013 | Long et al. | 123/445 |

FOREIGN PATENT DOCUMENTS

| | | |
|---|---|---|
| JP | 2002-357139 A | 12/2002 |
| JP | 2004-056754 A | 3/2007 |
| JP | 4214788 B2 | 11/2008 |

\* cited by examiner

SYSTEM FOR PREVENTING KNOCKING AND METHOD FOR CONTROLLING THE SAME

CROSS-REFERENCE TO RELATED APPLICATION

This application claims priority to and the benefit of Korean Patent Application No. 10-2010-0123014 filed Dec. 3, 2010, the entire contents of which application is incorporated herein for all purposes by this reference.

BACKGROUND OF INVENTION

1. Field of Invention

The present invention relates to a system for preventing knocking and a method for controlling the same. More particularly, the present invention relates to a system for preventing knocking and a method for controlling the same that prevent knocking by injecting a sub fuel including ethanol having high octane number to a combustion chamber in a case that the knocking occurs.

2. Description of Related Art

Generally, efficiency of spark ignition gasoline engines can be improved by operating the engines in a high compression ratio or reducing a size of the engine. If the engine is operated in the compression ratio or the size of the engine is reduced, however, knocking may occur and occurrence of the knocking may deteriorate performance of the engine.

In an end of combustion stroke, pressure and temperature at an end-gas zone in of a combustion chamber may increase and fuel may be self-ignited. The knocking may occur due to the self-ignition of the fuel. If the knocking occurs, the fuel is burned quickly and a piston may be damaged by vibrations. In addition, since combustion pressure is quickly lowered after reaching maximum pressure, performance of the engine may be deteriorated.

The engine compression ratio was lowered or ignition timing was lagged in order to prevent occurrence of the knocking according to prior arts. In this case, the performance of the engine may be deteriorated and fuel economy may be decreased.

In addition, it has been developed that ethanol having higher octane number than gasoline is directly injected to the combustion chamber and the ethanol is adapted to move to the end-gas zone by using a strong swirl flow. However, a method of injecting ethanol by using swirl flow cannot be applied to a gasoline direct injection engine in which the swirl flow is weak. In addition, if the ethanol is moved to the end-gas zone by using the swirl flow, precise operation may not be guaranteed.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a system for preventing knocking having advantages of preventing occurrence of knocking by injecting ethanol in a gasoline direct injection engine in which swirl flow is weak.

In various embodiments, a system for preventing knocking that has high reliability of operation by directly injecting the ethanol to an end-gas zone is provided.

In various embodiments, a control method that can control the system for preventing knocking optimally is provided.

A system for preventing knocking according to various embodiments of the present invention may include a cylinder, a piston moving in the cylinder reciprocally, forming a combustion chamber with the cylinder, and having a central axis, a first injector mounted at an upper surface of the cylinder with a distance from the central axis of the piston, and directly injecting a main fuel including gasoline into the combustion chamber, a second injector mounted at the upper surface of the cylinder on the central axis of the piston, and directly injecting a sub fuel including ethanol into the combustion chamber, and a spark plug disposed at the upper surface of the cylinder near the second injector.

The second injector may be adapted to inject the sub fuel in a hollow right circular cone shape.

An angle between confronting generating lines of the right circular cone shape may be 150-160°.

The second injector may be adapted to inject the sub fuel before the first injector injects the main fuel.

The second injector may be an injector of outwardly open type.

The first injector may inject the main fuel slantedly to the central axis of the piston.

A method for controlling a system for preventing knocking according to other aspects of the present invention may include detecting state variables of an engine, controlling injection of the main fuel according to the state variables of the engine, controlling ignition, determining whether knocking occurs, and controlling injection of the sub fuel in a case that the knocking occurs.

The sub fuel may be injected in a hollow right circular cone shape.

An angle between confronting generating lines of the right circular cone shape may be 150-160°.

The sub fuel may be adapted to be injected before the injection of the main fuel during a cycle in controlling the injection of the sub fuel.

The control of the injection of the sub fuel may be repeated until an injection amount of the sub fuel reaches a target injection amount in a state that the knocking occurs.

Engine operation may be controlled in a case that the knocking occurs in a state that the injection amount of the sub fuel reaches the target injection amount.

Control of the engine operation may include at least one of reducing a compression ratio of an air-fuel mixture and lagging ignition timing.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
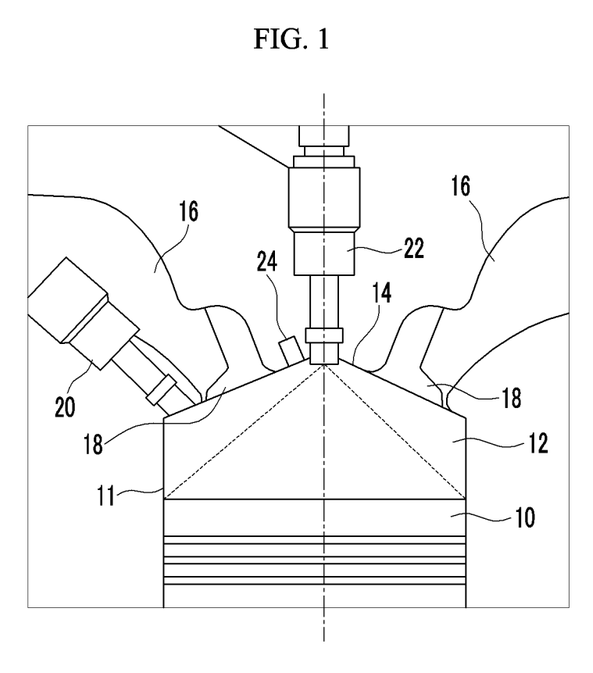
FIG. 1 is a cross-sectional view of an exemplary system for preventing knocking according to various embodiments of the present invention.

As shown in FIG. 1, a system for preventing knocking according to various embodiments of the present invention is mounted at an upper surface 14 of a cylinder 11 of an engine. A piston 10 is mounted in the cylinder 11, and the piston 10 moves reciprocally in the cylinder 11 due to combustion of an air-fuel mixture. A combustion chamber 12 is formed between an upper surface of the piston 10 and the upper surface 14 of the cylinder 11.

A pair of intake holes 16 is formed at the upper surface 14 of the cylinder 11, and an intake valve 18 is mounted at each intake hole 16 so as to open or close the intake hole 16. In addition, a pair of exhaust holes is formed at the upper surface 14 of the cylinder 11, and an exhaust valve is mounted at each exhaust hole so as to open or close the exhaust hole. The pair of intake holes 16 and the pair of exhaust holes are formed symmetrically to a plane including a central axis x of the piston 10, respectively.

A first injector 20 is mounted at the upper surface 14 of the cylinder 11 with a distance from the central axis x of the piston 10. The first injector 20 directly injects a main fuel including gasoline into the combustion chamber 12. The first injector 20 injects the main fuel toward the upper surface of the piston 10 slantedly to the central axis x of the piston 10. The main fuel injected from the first injector 20 is reflected at the upper surface of the piston 10 and is moved to the upper surface 14 of the cylinder 11. In order to guide movement of the main fuel, a recess may be formed at the upper surface of the piston 10.

A second injector 22 is mounted at the upper surface 14 of the cylinder 11 on the central axis x of the piston 10. The second injector 22 directly injects a sub fuel including ethanol into the combustion chamber 12. Particularly, the second injector 22 injects the sub fuel directly to an end-gas zone in the combustion chamber 12. For this purpose, the second injector 22 injects the sub fuel in a hollow right circular cone shape. That is, the sub fuel injected from the second injector 22 is stretched to the end-gas zone (near a cylinder liner) according to generating lines of the right circular cone. Since the sub fuel injected to the end-gas zone has higher octane number than the main fuel, knocking may not occur. In addition, since vapor pressure of the sub fuel is high, surrounding temperature is lowered when evaporation of the sub fuel and generation of hot spot is suppressed.

A spark plug 24 is disposed at the upper surface 14 of the cylinder 11 near the second injector 22. The main fuel reflected at the upper surface of the piston 10 is moved near the spark plug 24.

Figure 2:
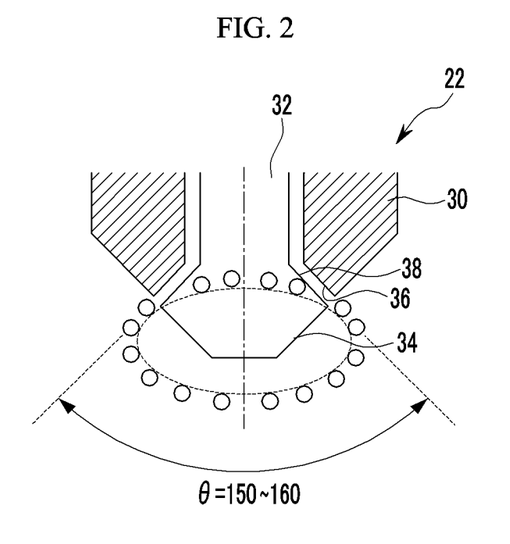
FIG. 2 is a partial cross-sectional view of an exemplary second injector according to the present invention.

Referring to FIG. 2, structure of the second injector 22 will be described in further detail.

As shown in FIG. 2, the second injector 22 includes a housing 30 and a needle 32 and is an injector of outwardly open type.

The housing 30 has cylindrical shape, and a first slanted surface 36 slanted to the central axis x of the piston 10 is formed at an interior circumference of a lower end portion thereof. An electromagnet for moving the needle 32 reciprocally is mounted at an upper portion of the housing 30.

The needle 32 moves in the housing 30 reciprocally and injects the sub fuel. A gap exists between the needle 32 and the housing 30 so as to form a sub fuel passage through which the sub fuel moves. A needle head 34 is formed at a lower end portion of the needle 32, and a second slanted surface 38 corresponding to the first slanted surface 36 is formed at an upper end portion of the needle head 34. Therefore, if the first and second slanted surfaces 36 and 38 are contacted the sub fuel is not injected, and if the second slanted surface 38 is parted from the first slanted surface 36 the sub fuel is injected to the combustion chamber 12. In addition, the first and second slanted surfaces 36 and 38 define an injection direction of the sub fuel injected from the second injector 22.

If electricity is applied to the electromagnet, the needle 32 moves downwardly and is protruded from the housing 30 downwardly. In this case, the first and second slanted surfaces 36 and 38 are parted from each other and the sub fuel is injected in the hollow right circular cone shape along the first and second slanted surfaces 36 and 38.

If electricity is not applied to the electromagnet, the needle 32 moves upwardly and the first and second slanted surfaces 36 and 38 contact to each other. Therefore, the sub fuel is not injected to the combustion chamber 12.

As described above, the sub fuel injected from the second injector 22 is injected into the combustion chamber 12 in the hollow right circular cone shape. At this time, an angle between confronting generating lines of the right circular cone shape may be 150-160°. The sub fuel injected from the second injector 22 is directly injected to the end-gas zone (i.e., near the cylinder liner) in the combustion chamber 12 due to the angle. Therefore, the knocking occurring mainly near the end-gas zone can be prevented. In various embodiments, the second injector 22 is positioned on the central axis x of the piston 10. Meanwhile, pressure of the sub fuel injected to the combustion chamber 12 may be 50-200 bar. The pressure is similar to that of the main fuel. In addition, a target injection amount of the sub fuel may be 3-5% of an injection amount of the main fuel.

Figure 3:
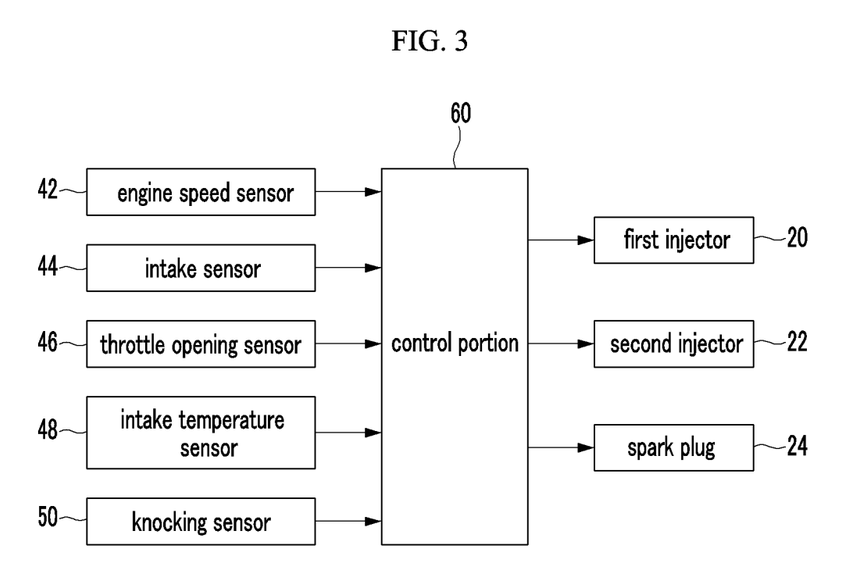
FIG. 3 is a block diagram showing relations of inputs and outputs of a control portion used in an exemplary method for controlling an exemplary system for preventing knocking according to the present invention.

As shown in FIG. 3, an engine speed sensor 42, an intake sensor 44, a throttle opening sensor 46, an intake temperature sensor 48, and a knocking sensor 50 are electrically connected to a control portion 60.

The engine speed sensor 42 detects a rotation speed of the engine from a phase change of a crankshaft and delivers a signal corresponding thereto to the control portion 60.

The intake sensor 44 detects flow amount of a fresh air flowing from the exterior and delivers a signal corresponding thereto to the control portion 60.

The throttle opening sensor 46 detects an opening of a throttle valve operated in accordance with operation of an accelerator pedal and delivers a signal corresponding thereto to the control portion 60. An accelerator pedal position sensor instead of the throttle opening sensor 46 may be used, and it is to be understood in this specification and claims that the throttle opening sensor 46 includes the accelerator pedal position sensor.

The intake temperature sensor 48 detects temperature of the fresh air flowing from the exterior and delivers a signal corresponding thereto to the control portion 60.

The knocking sensor 50 is mounted at a cylinder head or a cylinder block, determines from vibrations generated in combustion whether the knocking occurs, and delivers a signal corresponding thereto to the control portion 60.

The control portion 60 determines injection amount and injecting timing of the main fuel, injection amount and injecting timing of the sub fuel, and ignition timing based on state variables of the engine received from the sensors. The state variables of the engine include the engine speed, the flow amount and the temperature of the fresh air, and the opening of the throttle valve.

In addition, the control portion 60 controls operations of the first injector 20, the second injector 22, and the spark plug 24 in accordance with the injection amount and the injecting timing of the main fuel, the injection amount and the injecting timing of the sub fuel, and the ignition timing.

Figure 4:
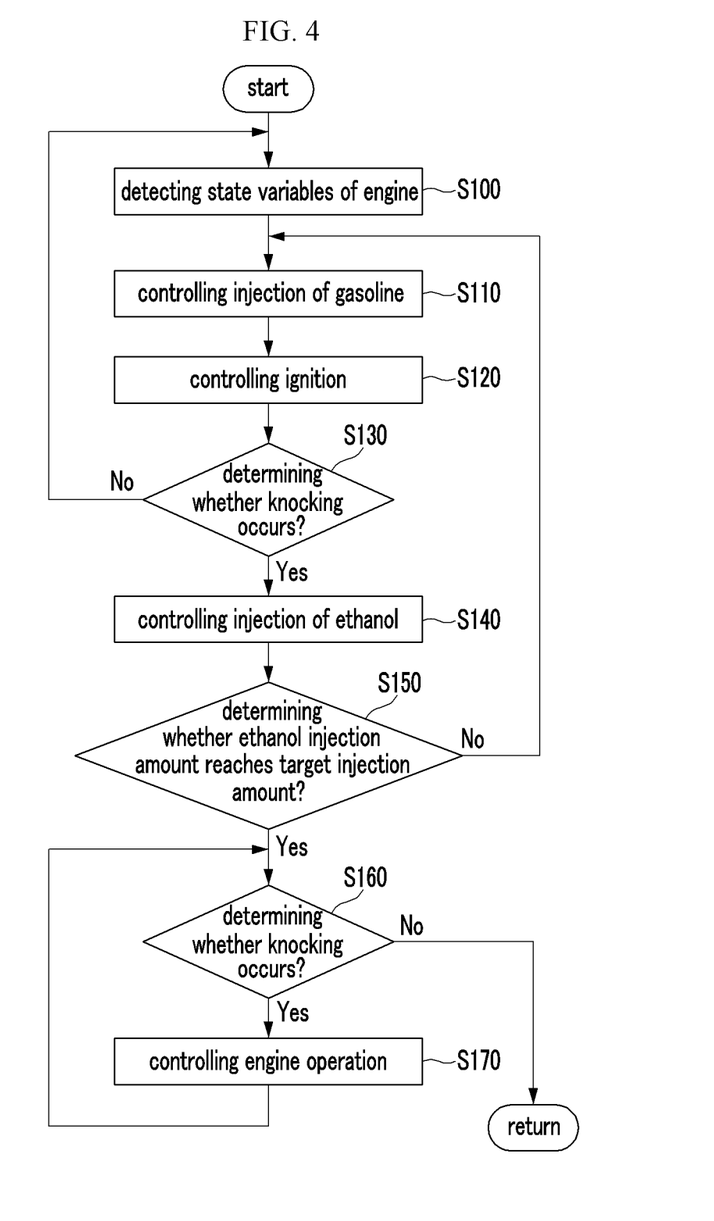
FIG. 4 is a flowchart of an exemplary method for controlling an exemplary system for preventing knocking according to the present invention.

Referring to FIG. 4, a method for controlling the system for preventing knocking according to various embodiments of the present invention will be described in detail.

As shown in FIG. 4, the sensors 42, 44, 46, 48, and 50 detects the state variables of the engine in a state that the engine operates at a step S100.

The control portion 60 determines the injection amount and injection timing of the main fuel based on the state variables of the engine detected by the sensors 42, 44, 46, 48, and 50, and controls an injection of the gasoline (main fuel) according to the injection amount and the injection timing of the main fuel at a step S110.

If the first injector 20 injects the gasoline to the combustion chamber by the control of the control portion 60, the control portion 60 controls the ignition timing through the spark plug 24 at a step S120.

After that, the control portion 60 determines from the knocking sensor 50 whether the knocking occurs at a step S130. The knocking sensor 50 determines that the knocking occurs when vibration amount generated in the combustion is larger than a predetermined vibration amount.

If the knocking does not occur at the step S130, the control portion 60 returns to the step S100 and detects the state variables of the engine.

If the knocking occurs at the step S130, the control portion 60 controls an injection of the ethanol (sub fuel) through the second injector 22 at a step S140. As described above, the ethanol is injected in the hollow right circular cone shape and is directly injected to the end-gas zone. In addition, the ethanol is not injected by the target injection amount, but is injected by a predetermined amount smaller than the target injection amount during a cycle. The amount of the ethanol injected by the predetermined amount is integrated.

The control portion 60 determines whether the integrated ethanol injection amount reaches the target injection amount at a step S150.

If the integrated ethanol injection amount does not reach the target injection amount at the step S150, the control portion 60 returns to the step S110, controls the gasoline injection and the ignition, and controls the ethanol injection if the knocking occurs.

If the integrated ethanol injection amount reaches the target injection amount at a step S150, the control portion 60 determines whether the knocking occurs by that time at a step S160.

If the knocking does not occur at the step S160, the control portion 50 finishes the method for controlling the system for preventing knocking and controls the engine normally.

If the knocking occurs at the step S160, the control portion 60 controls an engine operation to prevent occurrence of the knocking instead of increasing the ethanol injection amount at a step S170. Fuel combustion may be affected if the ethanol injection amount is larger than the target injection amount. Therefore, if the knocking occurs in a state that the ethanol is injected by the target injection amount, the engine operation is controlled to prevent the occurrence of the knocking despite loss in an engine output. The control of the engine operation includes at least one of reducing a compression ratio of an air-fuel mixture and lagging the ignition timing.

After that, the control portion 60 returns to the step S160 and determines whether the knocking occurs.

Figure 5:
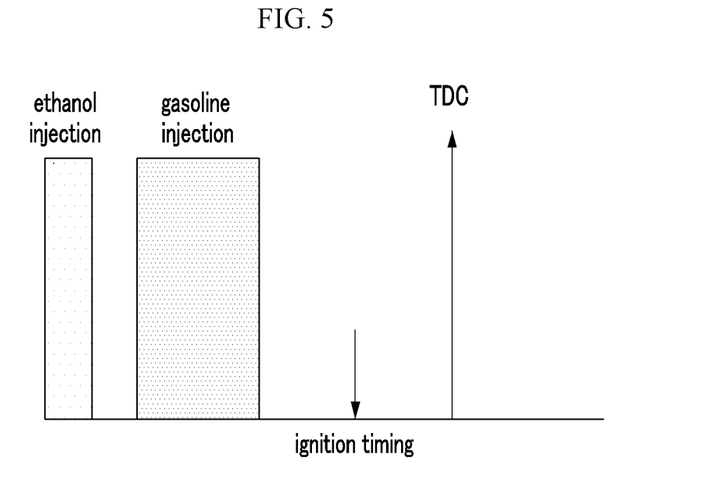
FIG. 5 is schematic diagram of exemplary injection timings of ethanol and gasoline according to the present invention.

As shown in FIG. 5, the ethanol is injected prior to the injection of the gasoline. If the ethanol is injected after the injection of the gasoline, it may be hindered by a flow of the gasoline that the ethanol moves to the end-gas zone. Therefore, the gasoline is injected after the ethanol is injected to the end-gas zone of the combustion chamber. After that, the ignition is controlled so as to prevent the occurrence of the knocking.

As described above, since ethanol is injected in a hollow right circular cone shape, the ethanol is directly injected to an end-gas zone according to various embodiments of the present invention. Therefore, an exemplary embodiment of the present invention is suitable for use in a gasoline direct injection engine in which a swirl flow is weak, and reliability of operation may be improved.

In addition, since the ethanol is injected prior to an injection of gasoline, a maximum effect may be gained with a minimum ethanol injection amount.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for preventing knocking, comprising:
   a cylinder;
   a piston reciprocally moving in the cylinder defining a combustion chamber within the cylinder and having a central axis;
   a first injector mounted at an upper surface of the cylinder at a predetermined distance from the central axis of the piston, and directly injecting a main fuel including gasoline into the combustion chamber;
   a second injector that includes a first slanted surface and is mounted at the upper surface of the cylinder on the central axis of the piston, the second injector directly injecting a sub fuel including ethanol into the combustion chamber;

wherein the second injector includes an needle head having an inverted and truncated cone shape; and wherein an upper side of the inverted and truncated cone shape has a second slanted surface corresponding to the first slanted surface;

wherein the needle head is selectively movable in the second injector such that the second injector directly injects the sub fuel in a hollow right circular cone shape through a space formed between the first slanted surface and the second slanted surface so as to inject the sub fuel into an end-gas zone of the combustion chamber; and a spark plug disposed at the upper surface of the cylinder adjacent the second injector, wherein an angle between confronting generating lines of the hollow right circular cone shape is formed for the sub fuel to be injected to the end-gas zone.

2. The system of claim 1, wherein an angle between confronting generating lines of the right circular cone shape is 150-160°.

3. The system of claim 1, wherein the second injector injects the sub fuel before the first injector injects the main fuel.

4. The system of claim 1, wherein the second injector is an outwardly open injector.

5. The system of claim 4, wherein the first injector injects the main fuel at an angle to the central axis of the piston.

6. A method for controlling a system for preventing knocking comprising:

providing a first injector mounted at an upper surface of a cylinder at a predetermined distance from a central axis of a piston and injecting a main fuel including gasoline into a combustion chamber, and a second injector that includes a first slanted surface and is mounted at the upper surface of the cylinder on the central axis of the piston and injecting a sub fuel including ethanol into the combustion chamber;

detecting state variables of an engine;

controlling injection of the main fuel according to the state variables of the engine;

controlling ignition;

determining whether knocking occurs; and controlling injection of the sub fuel in a case that the knocking occurs;

wherein the second injector includes a needle head having an inverted and truncated cone shape;

wherein an upper side of the inverted and truncated cone shape has a second slanted surface corresponding to the first slanted surface;

wherein the needle head is selectively movable in the second injector such that the sub fuel is injected in a hollow right circular cone shape through a space formed between the first slanted surface and the second slanted surface by the second injector so as to directly inject the sub fuel into an end-gas zone of the combustion chamber;

wherein an angle between confronting generating lines of the hollow right circular cone shape is formed for the sub fuel to be injected to the end-gas zone.

7. The method of claim 6, wherein an angle between confronting generating lines of the right circular cone shape is 150-160°.

8. The method of claim 6, wherein the sub fuel is injected before the injection of the main fuel during a cycle in controlling the injection of the sub fuel.

9. The method of claim 6, wherein the control of the injection of the sub fuel is repeated until an injection amount of the sub fuel reaches a target injection amount in a state that the knocking occurs.

10. The method of claim 9, wherein engine operation is controlled if the knocking occurs in a state that the injection amount of the sub fuel reaches the target injection amount.

11. The method of claim 10, wherein control of the engine operation includes at least one of reducing a compression ratio of an air-fuel mixture and lagging ignition timing.

* * * * *